(12) United States Patent
Seol

(10) Patent No.: US 11,486,482 B2
(45) Date of Patent: Nov. 1, 2022

(54) POWER TRANSMISSION DEVICE

(71) Applicant: PARALLOID GEAR CO., LTD., Gimpo-si (KR)

(72) Inventor: In Hwan Seol, Seoul (KR)

(73) Assignee: PARALLOID GEAR CO., LTD., Gimpo-si (KR)

( * ) Notice: Subject to any disclaimer, the term of this patent is extended or adjusted under 35 U.S.C. 154(b) by 190 days.

(21) Appl. No.: 17/054,487

(22) PCT Filed: Apr. 15, 2019

(86) PCT No.: PCT/KR2019/004505
§ 371 (c)(1),
(2) Date: Nov. 10, 2020

(87) PCT Pub. No.: WO2019/216561
PCT Pub. Date: Nov. 14, 2019

(65) Prior Publication Data
US 2021/0190191 A1 Jun. 24, 2021

(30) Foreign Application Priority Data

May 10, 2018 (KR) .......................... 10-2018-0053591

(51) Int. Cl.
*F16H 55/08* (2006.01)
*F16H 1/08* (2006.01)
*F16H 1/22* (2006.01)

(52) U.S. Cl.
CPC ............... *F16H 55/08* (2013.01); *F16H 1/08* (2013.01); *F16H 1/22* (2013.01); *F16H 1/225* (2013.01);
(Continued)

(58) Field of Classification Search
CPC ... F16H 55/08; F16H 1/08; F16H 1/22; F16H 1/225; F16H 55/0846; F16H 2055/0893
See application file for complete search history.

(56) References Cited

U.S. PATENT DOCUMENTS

| 739,262 A | * | 9/1903 | James | ....................... F16H 1/22 |
| | | | | 74/665 GD |
| 1,594,987 A | * | 8/1926 | Adams | .................... F16H 1/225 |
| | | | | 74/432 |

(Continued)

FOREIGN PATENT DOCUMENTS

| JP | 07-174213 A | 7/1995 |
| JP | 07-185935 A | 7/1995 |

(Continued)

OTHER PUBLICATIONS

International Search Report for PCT/KR2019/004505, dated Jul. 18, 2019, and its English translation.

(Continued)

*Primary Examiner* — Terence Boes
(74) *Attorney, Agent, or Firm* — Insight Law Group, PLLC; Seung Lee

(57) ABSTRACT

The present invention relates to a power transmission device, which includes: a worm shaft; a Janggu (slim waist drum)-shaped worm which is provided on the worm shaft, and has a diameter-reduced part whose outer diameter is increased toward both ends from a center thereof in an axial direction of the worm shaft, wherein the diameter-reduced part has spiral worm teeth formed thereon; a first transmission shaft disposed in parallel to the worm shaft at an interval; and a first transmission gear which is provided on the first transmission shaft, and includes first gear teeth having tooth shapes conjugated with the worm teeth of the Janggu-shaped worm and are continuously formed in a spiral shape on an outer circumferential surface thereof, thus to rotate by threadedly engaging with the worm teeth of the Janggu-shaped worm.

9 Claims, 6 Drawing Sheets

(52) U.S. Cl.
CPC . *F16H 55/0846* (2013.01); *F16H 2055/0893* (2013.01)

(56) References Cited

U.S. PATENT DOCUMENTS

| | | | | |
|---|---|---|---|---|
| 1,816,273 | A | * | 7/1931 | Wildhaber .......... F16H 55/0826 74/462 |
| 3,152,488 | A | * | 10/1964 | Sergan .................... F16H 1/225 74/427 |
| 3,229,541 | A | | 1/1966 | Wildhaber |
| 3,554,044 | A | * | 1/1971 | Hoglun .................. F16H 1/225 74/665 GD |
| 2007/0238571 | A1 | * | 10/2007 | Sugitani .................... F16H 1/08 475/227 |
| 2009/0283062 | A1 | * | 11/2009 | Taye .................. F01L 13/0021 123/90.15 |
| 2015/0276019 | A1 | * | 10/2015 | Kim .................... B23Q 16/025 74/664 |

FOREIGN PATENT DOCUMENTS

| | | |
|---|---|---|
| JP | 2003-0320434 A | 11/2003 |
| JP | 2009-047267 A | 3/2009 |
| JP | 2013-148109 A | 8/2013 |

OTHER PUBLICATIONS

German Office Action dated Feb. 3, 2022 for German Application No. 11-2019-002385.3.

\* cited by examiner

POWER TRANSMISSION DEVICE

CROSS-REFERENCE TO RELATED APPLICATIONS

This application is a 371 national phase entry of International Application No. PCT/KR2019/004505, filed on Apr. 15, 2019, which claims the benefit of and priority to Korean Patent Application No. 10-2018-0053591, filed on May 10, 2018, the disclosures of which are herein incorporated by reference in their entirety.

TECHNICAL FIELD

The present invention relates to a power transmission device, and more specifically, to a power transmission device which may transmit a power by using a new type of gear that threadedly engages with a worm gear of a Janggu (slim waist drum)-shaped worm.

BACKGROUND ART

A power transmission device is classified roughly divided into a gear train of transmitting a rotational motion into a linear motion, a gear train of transmitting a linear motion into a rotational motion, or a gear train of transmitting only rotational motion between gears to convert rotational speeds and torques thereof.

Conventionally, a power transmission system of the power transmission device mainly uses a gear having a tooth shape using an involute curve which is a trajectory drawn by an end of a thread, when unwinding the thread wound on a cylindrical reel in a taut state.

Such a gear train is a device in which a gear having teeth formed on a circumference thereof and another gear having teeth formed on a circumference thereof are threadedly engaged with each other to transmit a rotational motion or power between two or more shafts on which the gears are mounted. When using the gear train including the gears, the power or rotational motion may be reliably transmitted between the shafts with an accurate angular velocity ratio.

Types of these gears include spur gears, helical gears, bevel gears, worm and worm gears and the like.

In particular, the worm gears are special gears which have a significantly larger gear ratio than general gears, and input and output directions of the power are right angles to each other.

In a case of a power transmission device composed of the worm and the worm gear, the worm has a rod shape, whereas the worm gear whose teeth are in contact with teeth of the worm by threadedly engaging has a disk shape, and the teeth of the worm gear are formed at an interval along the circumference thereof. Therefore, there is a problem that a mutual contact area between the teeth of the worm and the worm gear is decreased, and as a result, an engagement rate therebetween is reduced.

In order to improve the above-described problem, as a power transmission device, a Janggu-shaped worm, for example, a Hindley worm, is known in the art.

The Janggu-shaped worm has an outer circumferential surface curved in a Janggu shape, and spiral grooves, that is, spiral teeth are formed in the curved region. The worm gear threadedly engaging with the worm has a large number of teeth, such that an area supporting the pressure between the teeth is larger than that of the common worm and worm gear.

Therefore, the Janggu-shaped worm and worm gear have characteristics that can transmit a large power while reducing wear thereof.

However, the conventional power transmission device uses such the Janggu-shaped worm and worm gear in a limited manner, and there has been no attempt to use it with various types of gears by taking full advantage of the characteristics of the Janggu-shaped worm.

SUMMARY OF INVENTION

Problems to be Solved by Invention

Accordingly, the applicant of the present invention has developed a new type of gear for the Janggu-shaped worm, which may rotate by threadedly engaging with the Janggu-shaped worm, and has come to complete the present invention relating to a power transmission device capable of transmitting power on the basis of the development.

Means for Solving Problems

In consideration of the above-mentioned circumstances, it is an object of the present invention to provide a power transmission device which may improve an engagement rate of gears while reducing wear of the gears, and enhance power transmission efficiency.

To achieve the above object, according to an aspect of the present invention, there is provided a power transmission device including: a worm shaft; a Janggu (slim waist drum)-shaped worm which is provided on the worm shaft, and has a diameter-reduced part whose outer diameter is increased toward both ends from a center thereof in an axial direction of the worm shaft, wherein the diameter-reduced part has spiral worm teeth formed thereon; a first transmission shaft disposed in parallel to the worm shaft at an interval; and a first transmission gear which is provided on the first transmission shaft, and includes first gear teeth having tooth shapes conjugated with the worm teeth of the Janggu-shaped worm and are continuously formed in a spiral shape on an outer circumferential surface thereof, thus to rotate by threadedly engaging with the worm teeth of the Janggu-shaped worm.

Herein, the worm teeth of the Janggu-shaped worm may have various pitch circle diameters and the same effective tooth height.

An outer periphery of the first transmission gear may have a cross-sectional shape in which an outer diameter is decreased toward both ends from a center thereof in an axial direction of the first transmission shaft corresponding to a cross-sectional shape of the diameter-reduced part.

The first gear teeth of the first transmission gear may have various pitch circle diameters and the same effective tooth height, and have axial modules, lead angles and axial pitches, which are conjugated with the worm teeth of the Janggu-shaped worm.

The power transmission device may further include: a second transmission shaft disposed to face the first transmission shaft in parallel thereto with the worm shaft interposed therebetween; and a second transmission gear which is provided on the second transmission shaft, and includes second gear teeth having tooth shapes conjugated with the worm teeth of the Janggu-shaped worm and are continuously formed on an outer circumferential surface thereof in a spiral shape, thus to rotate by threadedly engaging with the worm teeth of the Janggu-shaped worm.

An outer periphery of the second transmission gear may have a cross-sectional shape in which an outer diameter is decreased toward both ends from a center thereof in an axial direction of the second transmission shaft corresponding to the cross-sectional shape of the diameter-reduced part.

The second gear teeth of the second transmission gear may have various pitch circle diameters and the same effective tooth height, and have axial modules, lead angles and axial pitches, which are conjugated with the worm teeth of the Janggu-shaped worm.

The power transmission device may further include: a third transmission shaft disposed to face the first transmission shaft orthogonal thereto with the worm shaft interposed therebetween; and a third transmission gear which is provided on the third transmission shaft, and includes a plurality of third gear teeth formed on an outer circumferential surface thereof at an interval in a circumferential direction and threadedly engaged with the worm teeth of the Janggu-shaped worm.

The plurality of third gear teeth of the third transmission gear may have the same pitch circle diameter and effective tooth height, and have axial modules, lead angles and axial pitches, which are conjugated with the worm teeth of the Janggu-shaped worm.

Advantageous Effects

According to the present invention, it is possible to improve the engagement rate of gears while reducing wear of the gears, and enhance the power transmission efficiency.

MODE FOR CARRYING OUT INVENTION

Figure 1:
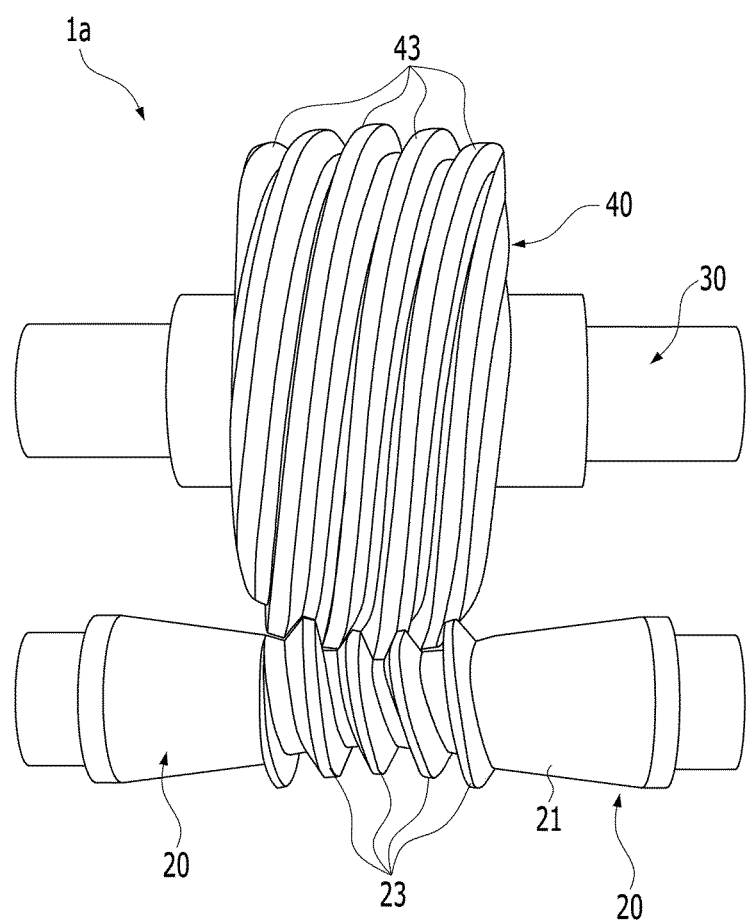
FIG. 1 is a front view illustrating a configuration of a power transmission device according to a first embodiment of the present invention.

The above and other aspects, features, and advantages of the invention will become apparent from the detailed description of the embodiments to be described in detail below in conjunction with the accompanying drawing. In this regard, it should be understood that the present invention is not limited to the following embodiments and may be embodied in various different ways, and that the embodiments are given to provide complete disclosure of the invention and to provide a thorough understanding of the invention to those skilled in the art.

Terms used herein are for the purpose of describing particular embodiments only and are not intended to limit the present invention thereto. As used herein, singular forms are intended to include the plural forms as well, unless the context clearly indicates otherwise. It will be further understood that the terms "comprises" and/or "comprising," as used herein, do not preclude the presence or addition of one or more elements other than those mentioned. Like reference numerals refer to like elements throughout the present disclosure, and "and/or" includes each mentioned component and all of one or more combinations of the mentioned components.

Unless otherwise defined, all terms (including technical and scientific terms) used herein have the same meaning as commonly understood by one of ordinary skill in the art to which the present disclosure pertains. Terms, such as those defined in commonly used dictionaries, are not to be construed in an idealized or overly formal sense unless expressly so defined herein.

Hereinafter, the present invention will be described in detail with reference to the accompanying drawings.

Prior to the description, in various embodiments, components having the same configuration are representatively described in the first embodiment by using the same reference numerals, and in other embodiments, configurations different from the first embodiment will be described.

Figure 2:
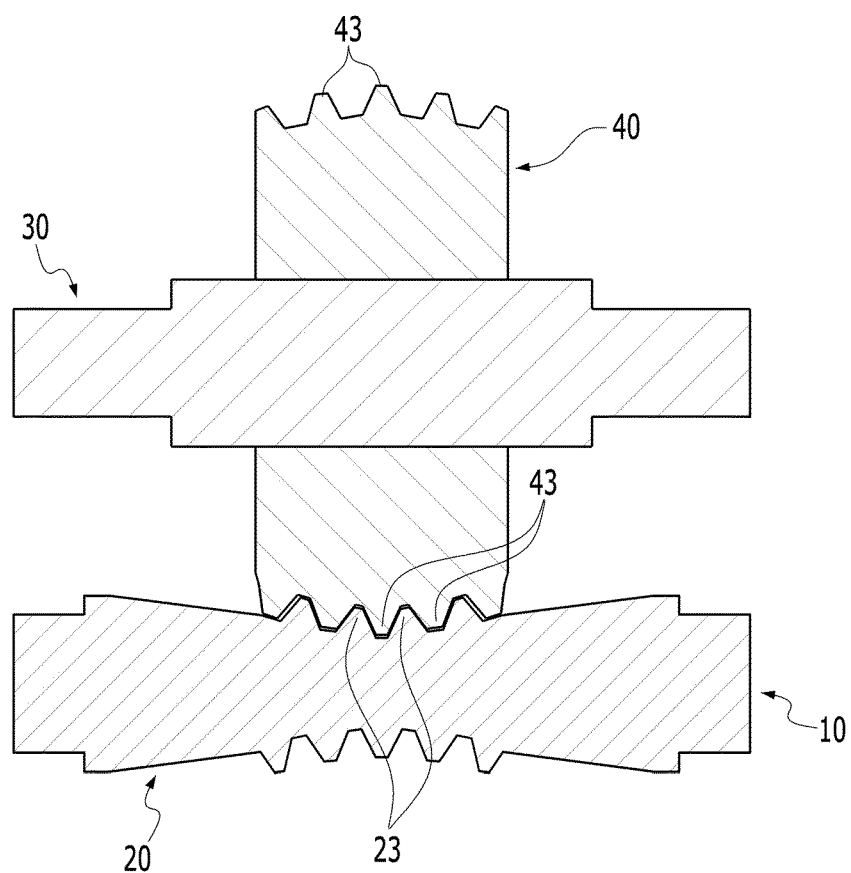
FIG. 2 is a front cross-sectional view illustrating major parts of FIG. 1.

FIGS. 1 and 2 show a power transmission device according to a first embodiment of the present invention.

As shown in FIGS. 1 and 2, a power transmission device 1a according to the first embodiment of the present invention includes a worm shaft 10, a Janggu-shaped worm 20, a first transmission shaft 30, and a first transmission gear 40.

The worm shaft 10 has a rod shape of a circular cross section having a predetermined length. Both ends of the worm shaft 10 are rotatably supported by bearings (not illustrated).

The Janggu-shaped worm 20 is provided in a central region of the worm shaft 10. The Janggu-shaped worm 20 forms a diameter-reduced part 21 whose outer diameter is increased toward both ends from a center thereof in an axial direction of the worm shaft 10.

Worm teeth 23 are formed on the diameter-reduced part 21. The worm teeth 23 have various axial modules, various lead angles, and various axial pitches according to the various pitch diameters, and are continuously formed on an outer circumferential surface of the diameter-reduced part in a spiral shape in the axial direction of the worm shaft 10. In addition, the worm tooth 23 has various pitch circle diameters corresponding to the cross-sectional shape of the diameter-reduced part 21 and has the same effective tooth height.

Meanwhile, in the present embodiment, although it is illustrated that the worm shaft 10 and the Janggu-shaped worm 20 are concentrically and integrally formed with each other, it is not limited thereto, and the worm shaft 10 and the Janggu-shaped worm 20 may be coupled by a key in a detachable manner.

Herein, it is preferable that the Janggu-shaped worm 20 has a relatively large outer diameter than the worm shaft 10.

The first transmission shaft 30 has a rod shape of a circular cross section having a predetermined length. The first transmission shaft 30 is disposed in parallel to the worm shaft 10 at an interval. Both ends of the first transmission shaft 30 are rotatably supported by bearings (not illustrated). In addition, the first transmission shaft 30 may be supported by the bearings so as not to move from side to side in the axial direction of the first transmission shaft 30.

The first transmission gear 40 has a disk shape with a predetermined thickness. An outer periphery of the first transmission gear 40 has a cross-sectional shape in which an outer diameter is decreased toward both ends from a center thereof in the axial direction of the first transmission shaft 30 corresponding to the cross-sectional shape of the diameter-reduced part 21 of the Janggu-shaped worm 20.

First gear teeth 43 having tooth shapes conjugated with the worm teeth 23 of the Janggu-shaped worm 20 are continuously formed on an outer circumferential surface of the first transmission gear 40 in a spiral shape in the axial direction of the first transmission shaft 30.

Each of the first gear teeth 43 of the first transmission gear 40 has various pitch circle diameters and the same effective tooth height. In addition, each of the first gear teeth 43 has an axial module, a lead angle, and an axial pitch, which are conjugated with the worm teeth 23 of the Janggu-shaped worm 20. Further, the first gear teeth 43 have the number of spirals calculated by multiplying the number of worm teeth 23 of the Janggu-shaped worm 20 by a gear ratio (reduction ratio).

Therefore, one flank of each first gear tooth 43 of the first transmission gear 40, for example, one tooth surface of each first gear tooth 43 simultaneously comes into contact with one flank of each worm tooth 23 of the Janggu-shaped worm 20, and rotates along the flank of each worm tooth 23 while being threadedly engaged therewith. At this time, one tooth surface of each first gear tooth 43 of the first transmission gear 40 comes into contact with one flank of each worm tooth 23 of the Janggu-shaped worm 20 in a straight line in a normal direction of the worm tooth 23. Therefore, when rotating at a high speed, lubricant is easily introduced and discharged between the worm teeth 23 and the first gear teeth 43. Thereby, it is possible to reduce a wear occurring between the worm teeth 23 and the first gear teeth 43, and increase the life of the Janggu-shaped worm 20 and the first transmission gear 40.

In addition, when assembling the first transmission gear 40 with the Janggu-shaped worm 20, the Janggu-shaped worm 20 and the first transmission gear 40 are arranged so that a center line of the Janggu-shaped worm 20 is orthogonal to an axial line of the worm shaft 10 while passing through a center line of the first transmission gear 40. Thereby, it is possible to improve the engagement rate between the Janggu-shaped worm 20 and the first transmission gear 40.

Meanwhile, the reduction ratio between the Janggu-shaped worm 20 and the first transmission gear 40 may be obtained by a ratio of the pitch circle diameter of the first transmission gear 40 to the pitch circle diameter of the Janggu-shaped worm 20 on the center line thereof.

Herein, according to the present embodiment, although it is illustrated that the first transmission shaft 30 and the first transmission gear 40 are coupled by a key, it is not limited thereto, and the first transmission shaft 30 and the first transmission gear 40 may be formed concentrically and integrally with each other.

Due to the above-described configuration, in the power transmission device 1a according to the first embodiment of the present invention, the worm shaft 10 and the first transmission shaft 30 are arranged in parallel to each other with an interaxis distance between a rotation center axial line of the worm shaft 10 and a rotation center axial line of the first transmission shaft 30.

Further, the Janggu-shaped worm 20 and the first transmission gear 40 are arranged so that the center of the Janggu-shaped worm 20 is orthogonal to the axial line of the worm shaft 10 while passing through the center line of the first transmission gear 40.

Accordingly, one flank of each first gear tooth 43 of the first transmission gear 40 simultaneously comes into contact with one flank of each worm tooth 23 of the Janggu-shaped worm 20 and rotates while being threadedly engaged with each other along the flanks. Thereby, the engagement rate of the Janggu-shaped worm 20 and the first transmission gear 40 may be improved while reducing the wear of the gears, and the power transmission efficiency may be enhanced.

In addition, the power transmission device 1a according to the first embodiment of the present invention may rotate the first transmission shaft 30 by reducing the number of revolutions input to the worm shaft 10 according to the pitch circle diameter of the Janggu-shaped worm 20 on the center line thereof and the pitch circle diameter of the first transmission gear 40.

Figure 3:
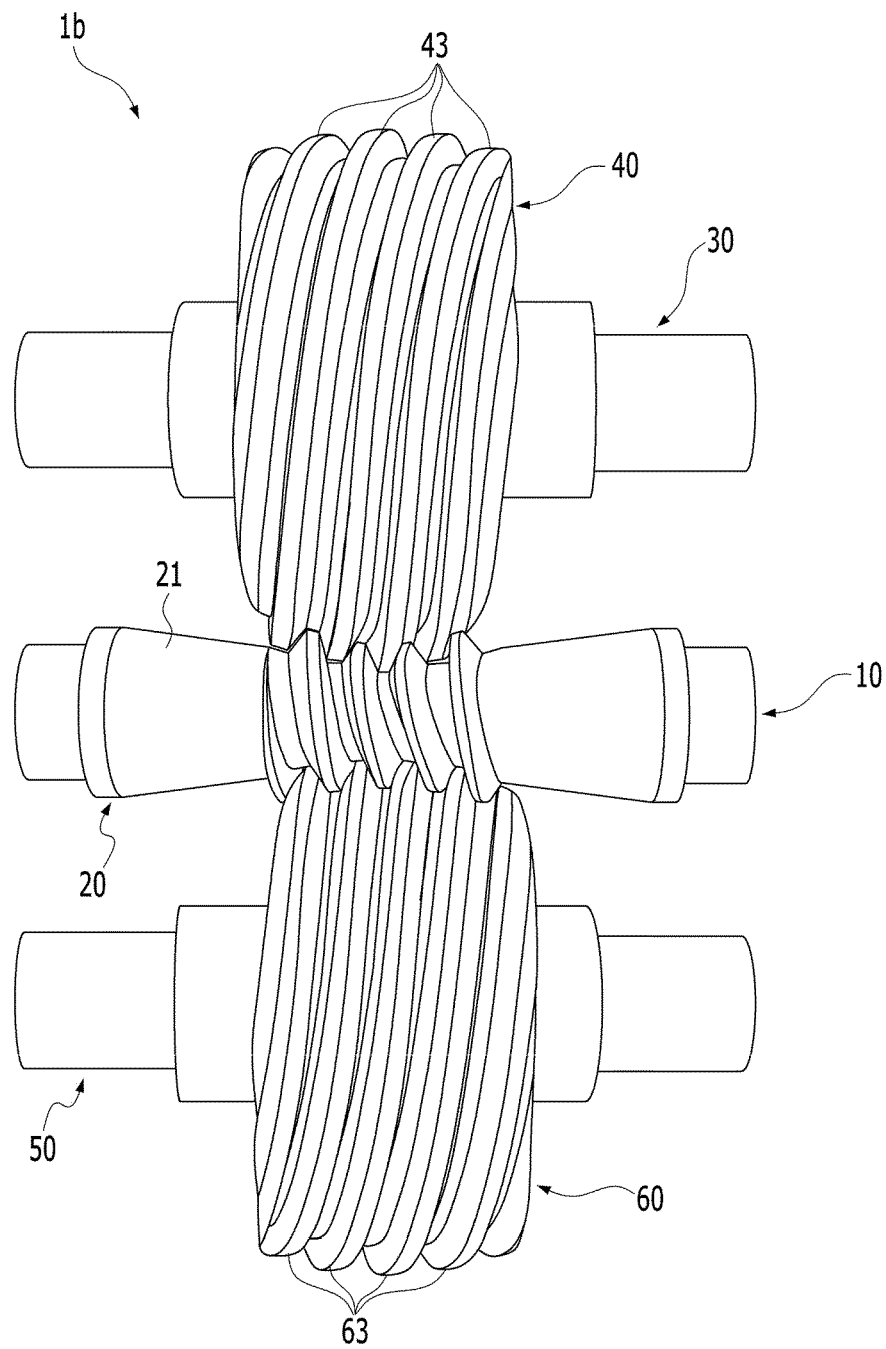
FIG. 3 is a front view illustrating a configuration of a power transmission device according to a second embodiment of the present invention.
Figure 4:
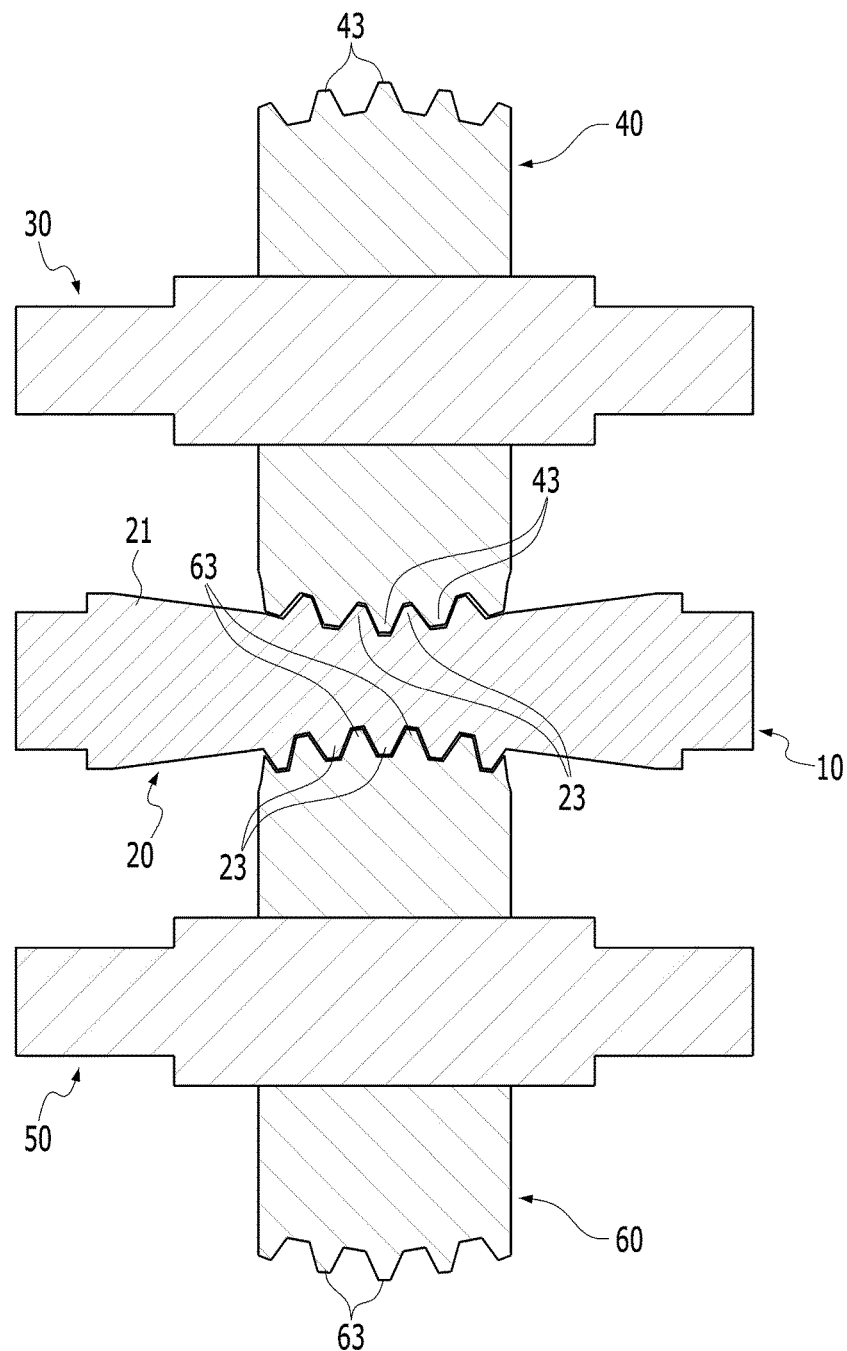
FIG. 4 is a front cross-sectional view illustrating major parts of FIG. 3.

Meanwhile, FIGS. 3 and 4 show a power transmission device according to a second embodiment of the present invention.

Unlike the first embodiment, a power transmission device 1b according to the second embodiment of the present invention has a configuration in which a second transmission shaft 50 and a second transmission gear 60 having the same structure as the first transmission shaft 30 and the first transmission gear 40 are disposed opposite to each other with the worm shaft 10 and the Janggu-shaped worm 20 interposed therebetween.

That is, the second transmission shaft 50 is disposed to face the first transmission shaft 30 in parallel thereto with the worm shaft 10 interposed therebetween.

The second transmission shaft 50 is disposed in parallel to the worm shaft 10 at an interval. Both ends of the second transmission shaft 50 are rotatably supported by bearings (not illustrated). In addition, the second transmission shaft 50 may be supported by the bearings so as not to move from side to side in an axial direction of the second transmission shaft 50.

The second transmission gear 60 has a disk shape with a predetermined thickness. An outer periphery of the second transmission gear 60 has a cross-sectional shape in which an outer diameter is decreased toward both ends from a center thereof in the axial direction of the second transmission shaft 50 corresponding to the cross-sectional shape of the diameter-reduced part 21 of the Janggu-shaped worm 20. Herein, the second transmission gear 60 may have the same outer diameter as or different outer diameter from the first transmission gear 40.

Second gear teeth 63 having the same tooth shape as the worm teeth 23 of the Janggu-shaped worm 20 are formed on an outer circumferential surface of the second transmission gear 60 in a spiral shape in the axial direction of the second transmission shaft 50.

Each of the second gear teeth 63 of the second transmission gear 60 has various pitch circle diameters and the same effective tooth height. In addition, each of the second gear teeth 63 has an axial module, a lead angle, and an axial pitch, which are conjugated with the worm teeth 23 of the Janggu-shaped worm 20. In addition, the second gear tooth 63 has the number of spirals calculated by multiplying the number of worm teeth 23 of the Janggu-shaped worm 20 by a desired gear ratio (reduction ratio).

Accordingly, one flank of each of the second gear teeth 63 of the second transmission gear 60 simultaneously comes into contact with one flank of each worm tooth 23 of the Janggu-shaped worm 20, and rotates while being threadedly engaged with each other along the flanks of each worm tooth 23. At this time, one tooth surface of each second gear tooth 63 of the second transmission gear 60 comes into contact with one flank of each worm tooth 23 of the Janggu-shaped worm 20 in a straight line in the normal direction of the worm tooth 23. Therefore, when rotating at a high speed, the lubricant is easily introduced and discharged between the worm teeth 23 and the second gear teeth 63. Thereby, it is possible to reduce wear occurring between the worm teeth 23 and the second gear teeth 63, and increase the life of the Janggu-shaped worm 20 and the second transmission gear 60.

In addition, when assembling the second transmission gear 60 with the Janggu-shaped worm 20, the Janggu-shaped worm 20 and the second transmission gear 60 are arranged so that the center line of the Janggu-shaped worm 20 is orthogonal to the axial line of the worm shaft 10 while passing through the center line of the second transmission gear 60. Thereby, it is possible to improve the engagement rate between the Janggu-shaped worm 20 and the second transmission gear 60.

Meanwhile, the reduction ratio between the Janggu-shaped worm 20 and the second transmission gear 60 may be obtained by a ratio of the pitch circle diameter of the second transmission gear 60 to the pitch circle diameter of the Janggu-shaped worm 20 on the center line thereof.

Herein, according to the present embodiment, although it is illustrated that the second transmission shaft 50 and the second transmission gear 60 are coupled by a key, it is not limited thereto, and the second transmission shaft 50 and the second transmission gear 60 may be formed concentrically and integrally with each other.

Due to the above-described configuration, in the power transmission device 1b according to the second embodiment of the present invention, the worm shaft 10 and the first transmission shaft 30 are arranged in parallel to each other with an interaxis distance between the rotation center axial line of the worm shaft 10 and the rotation center axial line of the first transmission shaft 30, and the worm shaft 10 and the second transmission shaft 50 are arranged in parallel to each other with an interaxis distance between the rotation center axial line of the worm shaft 10 and the rotation center axial line of the second transmission shaft 50.

In addition, the Janggu-shaped worm 20, the first transmission gear 40 and the second transmission gear 60 are arranged so that the center of the Janggu-shaped worm 20 is orthogonal to the axial line of the worm shaft 10 while passing through the center line of the first transmission gear 40 and the center line of the second transmission gear 60.

Accordingly, one flank of each first gear tooth 43 of the first transmission gear 40 and one flank of each second gear tooth 63 of the second transmission gear 60 simultaneously come into contact with one flank of each worm tooth 23 of the Janggu-shaped worm 20 and rotates while being threadedly engaged with each other along the flanks. Thereby, the engagement rate of the Janggu-shaped worm 20, the first transmission gear 40 and the second transmission gear 60 may be improved while reducing the wear of the gears, and the power transmission efficiency may be enhanced.

In addition, by forming the pitch circle diameters of the first transmission gear 40 and the second transmission gear 60 different from or equal to each other, the power transmission device 1b according to the second embodiment of the present invention may rotate the first transmission shaft 30 and the second transmission shaft 50 at the number of revolutions different from or equal to each other, by reducing the number of revolutions input to the worm shaft 10 at various reduction ratios through the Janggu-shaped worm 20, the first transmission gear 40 and the second transmission gear 60.

Accordingly, it is possible to implement a power transmission device having various reduction ratios.

Figure 5:
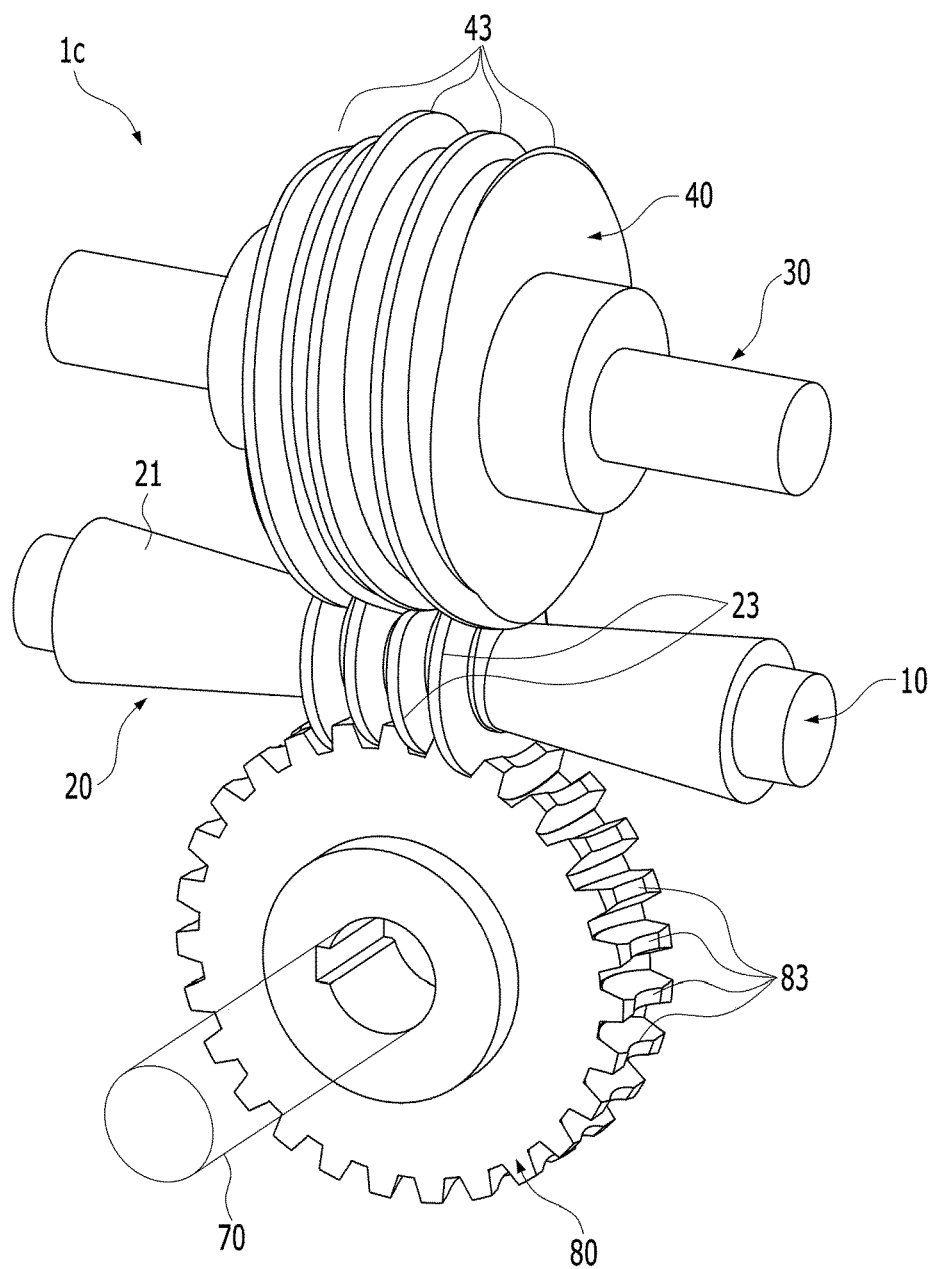
FIG. 5 is a front view illustrating a configuration of a power transmission device according to a third embodiment of the present invention.
Figure 6:
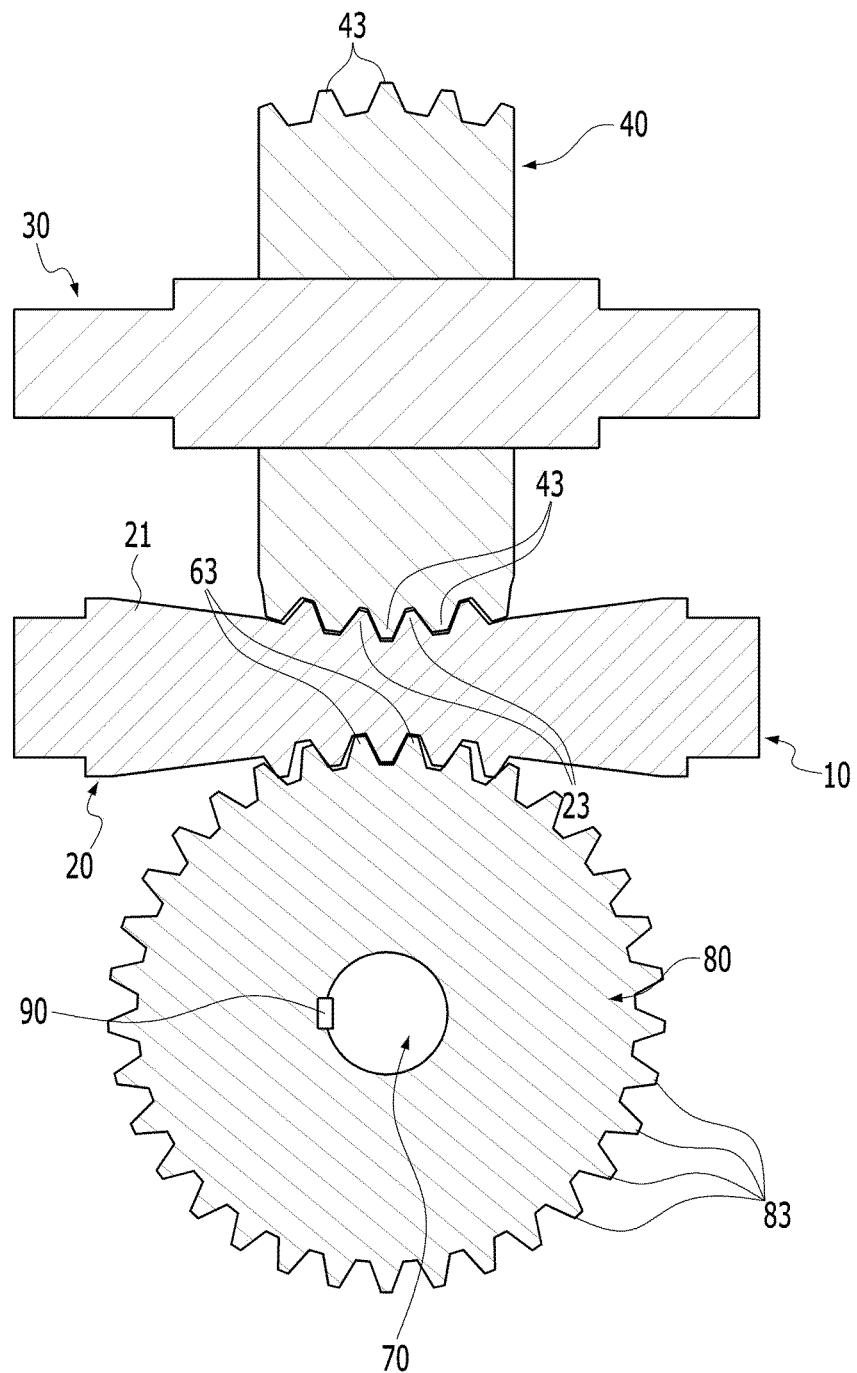
FIG. 6 is a front cross-sectional view illustrating major parts of FIG. 5.

FIGS. 5 and 6 show a power transmission device according to a third embodiment of the present invention.

Unlike the above-described first embodiment, a power transmission device 1c according to the third embodiment of the present invention further includes a third transmission shaft 70 and a third transmission gear 80.

The third transmission shaft 70 is disposed to face the first transmission shaft 30 orthogonal thereto with the worm shaft 10 interposed therebetween.

The third transmission shaft 70 is disposed orthogonal to the worm shaft 10 at an interval. Both ends of the third transmission shaft 70 are rotatably supported by bearings (not illustrated). In addition, the third transmission shaft 70 may be supported by bearings so as not to move from side to side in an axial direction of the third transmission shaft 70.

The third transmission gear 80 has a disk shape with a predetermined thickness. The outer periphery of the third transmission gear 80 is formed in a substantially circular shape in a circumferential direction thereof.

A plurality of third gear teeth 83 threadedly engaging with the worm teeth 23 of the Janggu-shaped worm 20 are formed on the outer circumferential surface of the third transmission gear 80 at an interval in the circumferential direction. The plurality of third gear teeth 83 of the third transmission gear 80 have the same pitch circle diameter and the same effective tooth height as each other, and have axial modules, lead angles, and axial pitches, which are conjugated with the worm teeth 23 of the Janggu-shaped worm 20.

Meanwhile, the reduction ratio between the Janggu-shaped worm 20 and the third transmission gear 80 may be obtained by a ratio of the number of third gear teeth of the third transmission gear 80 to the number of spirals of the Janggu-shaped worm 20.

It is preferable that the third transmission gear 80 as described above is coupled with the third transmission shaft 70 by a key 90.

Due to the above-described configuration, in the power transmission device 1c according to the third embodiment of the present invention, the worm shaft 10 and the first transmission shaft 30 are arranged in parallel to each other with an interaxis distance between the rotation center axial line of the worm shaft 10 and the rotation center axial line of the first transmission shaft 30, and the worm shaft 10 and the third transmission shaft 70 are arranged orthogonal to each other with an interaxis distance between the rotation center axial line of the worm shaft 10 and the rotation center axial line of the third transmission shaft 70.

In addition, the Janggu-shaped worm 20, the first transmission gear 40 and the third transmission gear 70 are arranged so that the center of the Janggu-shaped worm 20 is orthogonal to the axial line of the worm shaft 10 while passing through the center line of the first transmission gear 40 and the center line of the third transmission gear 70.

Accordingly, one flank of each first gear tooth 43 of the first transmission gear 40 simultaneously comes into contact with one flank of each worm tooth 23 of the Janggu-shaped worm 20 and rotates while being threadedly engaged with each other along the flanks. Thereby, the engagement rate of the Janggu-shaped worm 20 and the first transmission gear 40 may be improved while reducing the wear of the gears, and the power transmission efficiency may be enhanced.

In addition, the worm tooth 23 of the Janggu-shaped worm 20 rotates while being threadedly engaged with one flank of the third gear tooth 83 of the third transmission gear 80 in a vertical direction of the flank, for example, in the normal direction of the third gear tooth 83.

Therefore, by threadedly engaging each of the first transmission gear 40 and the third transmission gear 80, which have different forms from each other, with the Janggu-shaped worm 20, it is possible to rotate the first transmission shaft 30 and the third transmission shaft 70 at the number of revolutions different from or equal to each other, by reducing the number of revolutions input to the worm shaft 10 at various reduction ratios through the Janggu-shaped worm 20, the first transmission gear 40 and the third transmission gear 80.

Accordingly, by having a form in which the first transmission shaft 30 and the third transmission shaft 70 are orthogonal to each other, it is possible to implement various types of power transmission devices, as well as power transmission devices having various reduction ratios.

The invention claimed is:

1. A power transmission device comprising:
   a worm shaft;
   a Janggu (slim waist drum)-shaped worm which is provided on the worm shaft, and has a diameter-reduced part whose outer diameter is increased toward both ends from a center thereof in an axial direction of the worm shaft, wherein the diameter-reduced part has spiral worm teeth formed thereon;
   a first transmission shaft disposed in parallel to the worm shaft at an interval; and
   a first transmission gear which is provided on the first transmission shaft, and includes first gear teeth having tooth shapes conjugated with the worm teeth of the Janggu-shaped worm and are continuously formed in a spiral shape on an outer circumferential surface thereof, thus to rotate by threadedly engaging with the worm teeth of the Janggu-shaped worm.

2. The power transmission device according to claim 1, wherein the worm teeth of the Janggu-shaped worm have various pitch circle diameters and the same effective tooth height.

3. The power transmission device according to claim 1, wherein an outer periphery of the first transmission gear has a cross-sectional shape in which an outer diameter is decreased toward both ends from a center thereof in an axial direction of the first transmission shaft corresponding to a cross-sectional shape of the diameter-reduced part.

4. The power transmission device according to claim 3, wherein the first gear teeth of the first transmission gear have various pitch circle diameters and the same effective tooth height, and have axial modules, lead angles and axial pitches, which are conjugated with the worm teeth of the Janggu-shaped worm.

5. The power transmission device according to claim 1, further comprising:
   a second transmission shaft disposed to face the first transmission shaft in parallel thereto with the worm shaft interposed therebetween; and
   a second transmission gear which is provided on the second transmission shaft, and includes second gear teeth having tooth shapes conjugated with the worm teeth of the Janggu-shaped worm and are continuously formed on an outer circumferential surface thereof in a spiral shape, thus to rotate by threadedly engaging with the worm teeth of the Janggu-shaped worm.

6. The power transmission device according to claim 5, an outer periphery of the second transmission gear has a cross-sectional shape in which an outer diameter is decreased toward both ends from a center thereof in an axial direction of the second transmission shaft corresponding to the cross-sectional shape of the diameter-reduced part.

7. The power transmission device according to claim 6, wherein the second gear teeth of the second transmission gear have various pitch circle diameters and the same effective tooth height, and have axial modules, lead angles and axial pitches, which are conjugated with the worm teeth of the Janggu-shaped worm.

8. The power transmission device according to claim 1, further comprising:
   a third transmission shaft disposed to face the first transmission shaft orthogonal thereto with the worm shaft interposed therebetween; and
   a third transmission gear which is provided on the third transmission shaft, and includes a plurality of third gear teeth formed on an outer circumferential surface thereof at an interval in a circumferential direction and threadedly engaged with the worm teeth of the Janggu-shaped worm.

9. The power transmission device according to claim 8, wherein the plurality of third gear teeth of the third transmission gear have the same pitch circle diameter and effective tooth height, and have axial modules, lead angles and axial pitches, which are conjugated with the worm teeth of the Janggu-shaped worm.

* * * * *